US012642282B2

(12) United States Patent
Dubief et al.

(10) Patent No.: US 12,642,282 B2
(45) Date of Patent: Jun. 2, 2026

(54) METHOD TO SELECT THE SMOKE TREATING UNIT OF A ROASTING APPARATUS

(71) Applicant: SOCIETE DES PRODUITS NESTLE S.A., Vevey (CH)

(72) Inventors: Flavien Florent Dubief, Champagne (CH); Stefano Ceccaroli, Chavornay (CH); Joel Morend, Chatonnaye (CH); Thomas Rudi S. Degreef, Grimbergen (BE); Ben Van Dyck, Brecht (BE); Jochem David Grietens, Keerbergen (BE)

(73) Assignee: Societe des Produits Nestle S.A., Vevey (CH)

( * ) Notice: Subject to any disclaimer, the term of this patent is extended or adjusted under 35 U.S.C. 154(b) by 802 days.

(21) Appl. No.: 17/758,159

(22) PCT Filed: Dec. 31, 2020

(86) PCT No.: PCT/EP2020/088086
§ 371 (c)(1),
(2) Date: Jun. 29, 2022

(87) PCT Pub. No.: WO2021/136838
PCT Pub. Date: Jul. 8, 2021

(65) Prior Publication Data
US 2023/0024471 A1 Jan. 26, 2023

(30) Foreign Application Priority Data
Dec. 31, 2019 (EP) ..................................... 19220244

(51) Int. Cl.
*A23F 5/04* (2006.01)
*G06Q 10/06* (2023.01)

(52) U.S. Cl.
CPC ............... *A23F 5/04* (2013.01); *G06Q 10/06* (2013.01)

(58) Field of Classification Search
CPC ...... A23N 12/08; A23N 12/125; G06Q 10/06; A23F 5/04; B01D 53/346; B01D 53/86;
(Continued)

(56) References Cited

U.S. PATENT DOCUMENTS

| | | | |
|---|---|---|---|
| 5,928,697 A | 7/1999 | Argiles Felip | |
| 6,499,391 B1 | 12/2002 | Su | |
| 8,734,210 B2 * | 5/2014 | Burdett ................... | F24F 11/63 |
| | | | 126/299 F |

FOREIGN PATENT DOCUMENTS

| | | |
|---|---|---|
| CN | 104797323 A | 7/2015 |
| CN | 109142175 A | 1/2019 |
(Continued)

OTHER PUBLICATIONS

Chinese Office Action for Appl No. 202080086791.8 dated Jul. 30, 2023.
(Continued)

*Primary Examiner* — Subbalakshmi Prakash
(74) *Attorney, Agent, or Firm* — K&L Gates LLP

(57) ABSTRACT

The invention concerns a method to select the smoke treating unit (3) of a system (1) of a roasting apparatus (2) and an associated smoke treating unit when said system is used in a room (10), said method comprising: —receiving room data input, —receiving roasting use data input in order to determine the quantity of each contaminant produced by the roasting apparatus during a period, —for each system of the roasting apparatus and of one smoke treating units, calculating the concentration of each contaminant present in the room during said period, —for each system and for each contaminant, comparing the calculated concentration of said contaminant present in the room during the period with the
(Continued)

concentration of said contaminant authorised according to local health and safety regulations, —selecting the smoke treating unit of the system in the list of smoke treating units providing for each contaminant a calculated concentration inferior to the authorised concentration.

9 Claims, 9 Drawing Sheets

(58) Field of Classification Search
CPC .............. B01D 53/75; B01D 2257/502; B01D 2255/102; B01D 2257/404; B01D 2259/4508; B01D 2257/302; B01D 2257/708; B01D 2258/0275; B01D 2253/102
USPC ........................................................ 426/466
See application file for complete search history.

(56) References Cited

FOREIGN PATENT DOCUMENTS

| CN | 110288500 A | 9/2019 |
|----|-------------|--------|
| DE | 2354780 | 5/1975 |
| DE | 10156887 | 4/2003 |
| JP | 2017042083 A | 3/2017 |
| JP | 2018113958 A | 7/2018 |
| WO | 2009049860 | 4/2009 |

OTHER PUBLICATIONS

Japanese Office Action for Appl No. 2022-537667 dated Jan. 7, 2025, 3 pages.

* cited by examiner

| | INPUT DATA | |
|---|---|---|
| | | consecutive |
| | | every 15 minutes |
| COUNTRY | | every half hour |
| COFFEE ROASTED PER DAY [KG] | | spread over 8 hour shift |
| ROASTING SCENARIO | | △ |
| FLOORSPACE [M²] | | |
| CEILING HEIGHT [M] | | Light |
| VENTILATION RATE [M³/H] | | Medium |
| ROASTING LEVEL | | Dark |
| BEAN TYPE | | △ |
| BEANS PER ROAST [G] | | ▽ |
| MAX. NUMBER OF PEOPLE | | Robusta |
| | | Arabica |
| | | Blend |

| RESULTS | WITHOUT SMOKE TREATING UNIT | |
|---|---|---|
| | WITH SMOKE TREATING UNIT 36 | |
| | WITH SMOKE TREATING UNIT 35 | |
| | WITH SMOKE TREATING UNIT 34 | OK |

Figure 3A

|  | INPUT DATA |
| --- | --- |
| COUNTRY | Netherlands |
| COFFEE ROASTED PER DAY [KG] | 10 |
| ROASTING SCENARIO | Consecutive |
| FLOORSPACE [M²] | 100 |
| CEILING HEIGHT [M] | 2 |
| VENTILATION RATE [M³/H] | 200 |
| ROASTING LEVEL | Dark |
| BEAN TYPE | Robusta |
| BEANS PER ROAST [G] | 250 |
| MAX. NUMBER OF PEOPLE | 20 |

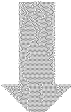

| RESULTS | | |
| --- | --- | --- |
|  | WITHOUT SMOKE TREATING UNIT | Not sufficient |
|  | WITH SMOKE TREATING UNIT 36 | Not sufficient |
|  | WITH SMOKE TREATING UNIT 35 | OK |
|  | WITH SMOKE TREATING UNIT 34 | OK |

Figure 3B

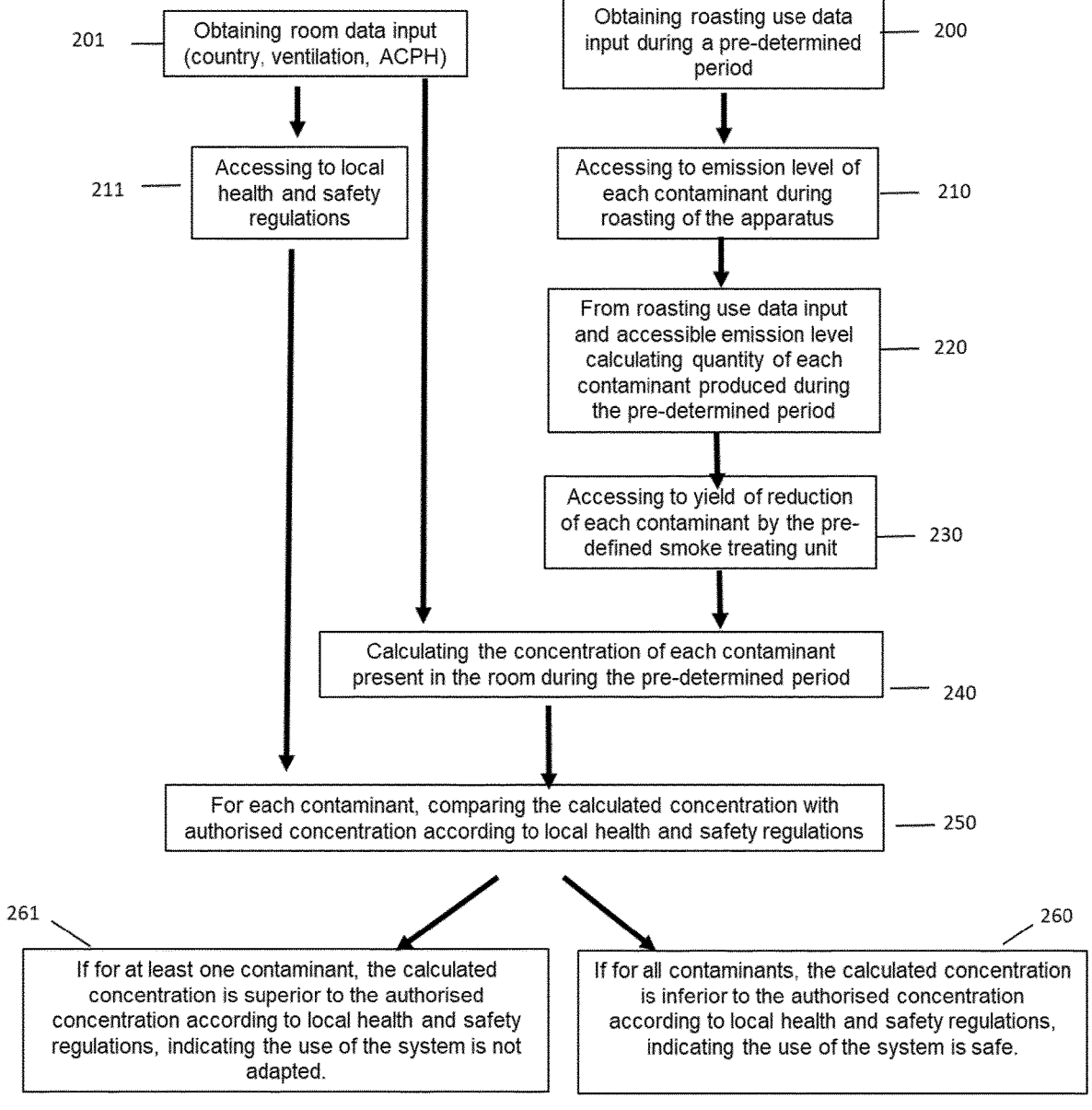

201 — Obtaining room data input (country, ventilation, ACPH)

200 — Obtaining roasting use data input during a pre-determined period

211 — Accessing to local health and safety regulations

210 — Accessing to emission level of each contaminant during roasting of the apparatus 220 — From roasting use data input and accessible emission level calculating quantity of each contaminant produced during the pre-determined period 230 — Accessing to yield of reduction of each contaminant by the pre-defined smoke treating unit 240 — Calculating the concentration of each contaminant present in the room during the pre-determined period 250 — For each contaminant, comparing the calculated concentration with authorised concentration according to local health and safety regulations 261 — If for at least one contaminant, the calculated concentration is superior to the authorised concentration according to local health and safety regulations, indicating the use of the system is not adapted.

260 — If for all contaminants, the calculated concentration is inferior to the authorised concentration according to local health and safety regulations, indicating the use of the system is safe.

METHOD TO SELECT THE SMOKE TREATING UNIT OF A ROASTING APPARATUS

CROSS REFERENCE TO RELATED APPLICATIONS

The present application is a National Stage of International Application No. PCT/EP2020/088086, filed on Dec. 31, 2020, which claims priority to European Patent Application No. 19220244.8, filed on Dec. 31, 2019, the entire contents of which are being incorporated herein by reference.

FIELD OF THE INVENTION

The present invention relates to a method for roasting coffee beans in a safe environment.

BACKGROUND OF THE INVENTION

The roasting of coffee beans is a well-known process. The main steps consists in heating the beans to a desired roasting level and then cooling or quenching the heated beans to stop the roasting. During heating, smoke is emitted. This smoke contains safe and desired compounds all together, in particular the usual roasted coffee aroma, but also undesired less safe compounds such as diacetyl, pyridine, 2-furane methanol, caffeine furfural, formaldehyde, acetaldehyde, CO, $CO_2$, $NO_2$, $SO_2$, ozone and particulate matters (PM2.5, PM10).

When roasting is implemented in manufacturing places producing important quantities of roasted beans, generally all the conditions for catching unsafe compounds are supplied.

But, there is a recent trend to implement small batch roasting with small roasters in shops, restaurants and coffees where customers are able to consume coffee brewed from freshly roasted beans. The roaster does not only provide freshness and theater advantages, but also dispenses the pleasant roasted coffee aroma inside the shop or coffee.

Yet, as mentioned above, harmful compounds are emitted too. When the roaster is used in a closed environment like a shop, café or restaurant, the emission of some compounds can become harmful depending on the size of the room, the ventilation of the room, . . . . For people working several hours in the room, smelling the smokes of the roaster can lead to a health problem. The strong odor of roasting can becomes a pain after several hours.

As a result, in such an environment, it is recommended to treat the smoke produced by the roaster to avoid any healthy issue for people present in the shop. The existing solutions consist in filtering or using catalytic converter to catch or destroy harmful compounds of the smoke or even evacuating the smoke outside by an outlet duct connected to the roaster.

In practice, it has been observed that these current existing solutions do not guarantee a zero emission or at least a safe reduction of harmful compounds systematically. Actually, roasters operated in shops, cafés or restaurants can be used to roast various different beans sometimes at different levels of roasting in order to provide their customers with variety and original or customized roasted beans. Due to this variety, a wide range of beans and roasting conditions are implemented. These different beans and these different roasting conditions emit different types and levels of compounds and the existing solutions may not be configured to treat smokes of some unusual roasting that would emit particularly high concentrated in harmful compounds.

In addition, in each shop, the operator can roast different quantities of coffee beans per day. A small shop with a high output of roasted beans may rapidly reach a high level of contaminants inside the shop and require a very efficient treatment of the smoke from the roaster which may not be required in a big café roasting less coffee beans.

Lastly, the size of the shop, café or restaurant, as well as the ventilation rate inside the room, can vary with a direct impact on the concentration of emitted contaminants in the public room.

A common solution would be to use a powerful smoke treating unit configured to be able to treat smokes with a high level of harmful compounds if they happen to be produced from time to time, but the counterpart becomes the price and mostly the size of such a unit that is not adapted to the small size roasting device of a shop, café or restaurant. Other disadvantages of powerful smoke treating unit are:

in the case of a catalytic converter: systematic implementation of high temperatures since this converter is usually implemented at a temperature comprised between 300 and 600° C. meaning impact on the shop, café or restaurant environment, risk of burning of the operator and impact on the other technical parts of the roaster.

noise in particular linked to the need of a powerful ventilation, high electrical power consumption. With only one phase (120 V or 230 V), the above targeted temperature can hardly be reached by a catalytic converter.

volume taken by the powerful smoke treating unit in the shop, in particular with the use of a duct connecting the roaster smoke outlet to the outside.

An object of the present invention is to provide a method to select a smoke treating unit adapted to the safe operation of a coffee beans roasting apparatus in a specific room and enabling the reduction of emission of harmful gaseous compounds to a safe level for that use.

Another object is to provide a method to predict the safe operation of a pre-determined system of a roasting apparatus and a smoke treating unit in different rooms.

SUMMARY OF THE INVENTION

In a first aspect of the invention, there is provided a method to select the smoke treating unit of a system of at least one pre-defined coffee beans roasting apparatus and an associated smoke treating unit configured to treat the smoke emitted by said at least one roasting apparatus when said system is used in a room, wherein said smoke treating unit is selected from a group of different smoke treating units, said smoke treating units differing by their performances to treat contaminants of the smoke, said method comprising the steps of:

receiving room data input indicating the country of the room and providing directly or indirectly the ventilation of said room, receiving roasting use data input indicating the intended use of the at least one roasting apparatus during a pre-determined period in order to determine the quantity of each contaminant produced by said at least one roasting apparatus during said period for said use, for each system of the at least one roasting apparatus and of one of the smoke treating units, calculating from the determined quantity of each contaminant produced by the at least one roasting apparatus during the period for said use, from the performance in reducing the level of said contaminant by the smoke treating unit, and from the provided ventilation rate, the concentration of each contaminant present in the room during the period, for each system and for each contaminant, comparing the calculated concentration of said contaminant present in the room during the period with the concentration of said contaminant authorised according to local health and safety regulations, selecting at least one smoke treating unit of the system in the list of smoke treating units providing for each contaminant a calculated concentration inferior to the authorised concentration.

In the method, the roasting apparatus and the smoke treating unit forms a system to roast coffee beans and treat the smoke generated during the roasting operation. This system is configured to stand in a room.

The system usually comprises one roasting apparatus and one smoke treating unit as developed below. Yet, in some configurations, the system can comprise several roasting apparatuses and one smoke treating unit configured to treat the smoke produced by all said roasting apparatuses. In that case, the method can be applied in a similar manner as developed below taking into account the roasting use data input indicating the intended use of all the roasting apparatuses.

For a pre-defined roasting apparatus and for a pre-determined room, the method is implemented to enable the selection of the smoke treating unit. Accordingly, the method enables a coffee shop owner, who has decided to use a particular coffee beans roasting apparatus in his/her shop, to select the smoke treating unit to be associated to said roasting apparatus and that guarantees he/she can use the roasting apparatus according to his/her habits and that the treatment of the smoke produced by the roaster is sufficient to the respect of the health and safety regulations relative to contaminant levels in public areas and working environments in his/her shop.

Any type of roasting apparatus can be used. In the roasting apparatus, coffee beans are heated and preferably mixed to homogenise heating through the beans.

The source of heating can be a burner (meaning combustion) fed by natural gas, liquefied petroleum gas (LPG) or even wood. Alternatively the heat source can be an electrical resistor, a ceramic heater, a halogen source, a source of infrared or of microwaves.

Preferably the source of heating is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The mixing of the beans can be obtained with a fluidic bed of hot air or mechanically with stirring blades or a rotating drum.

Preferably the roasting apparatus is a hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment, generally hot air.

The associated smoke treating unit treats the smoke produced by the roasting apparatus and the method enables the selection of said unit from a group of different smoke treating units that differ by their performances to treat contaminants of the smoke, in particular by their yields in reducing the levels of compounds present inside the smoke.

By smoke treating unit configured to treat the smoke produced by the roasting apparatus, it is understood indifferently:

an active treating unit that destroys contaminants inside the apparatus, such as an afterburner enabling thermal oxidation of contaminants or a catalytic afterburner or a catalytic device providing selective catalytic reduction with ammonia sleep catalyst to filter $NO_x$ or an active device that device that retains contaminants such as desulfurization of gases trapping $SO_2$ by dry or wet technology, a wet scrubber retaining VOC and particulate matters or an electrostatic precipitator to retain particulate matters after ionisation by means of high voltage, or a passive treating unit that retains contaminants inside the apparatus like mechanical filters (metallic sieves or paper filter), an active carbon filter or a cyclone, or a unit that diverts contaminants away from the room (such as a duct connected to the outside of the room), or a combination of the above units.

By yield of a smoke treating unit in reducing the level of one particular compounds present inside the smoke, it is understood the percentage of reduction of said compound present in the smoke after treatment by that smoke treating unit.

An afterburner thermally oxidises any types of gas and particulate matters, in particular contaminants like CO and $CO_2$, at very high temperatures, generally above 700° C., and converts them into oxides such as $CO_x$, $NO_x$, $SO_x$.

A catalytic afterburner comprises a ceramic or metallic substrate coated with a catalytic impregnating agent containing precious metals, such as nanoparticles of copper oxide, nanoparticles of iron oxide, and typically one or more metals of the platinum group (platinum, palladium, rhodium). The operation of the catalytic afterburner requires a lower temperature than an afterburner: the temperature is generally comprised between 300° C. and 500° C. Conveniently, although not necessarily, before the smoke is passed into the catalytic converter, it is pre-heated, generally by means of a heat-exchanger fed with the smoke emerging from the catalytic converter.

Filters are usually able to retain volatile organic compounds (VOCs), hydrocarbons and particulate matters (PM). The smoke treating unit can comprise several filters depending on their ability to retain specific contaminants. Filters configured for trapping VOCs and hydrocarbons are preferably active carbon filter or charcoal filter. Filters configured for trapping particulate matters are preferably high efficiency particulate accumulator (HEPA) filters, metallic filters (for example ultrafine steel wool media filter) or paper filter. Electrostatic precipitators can be used to trap PM.

Most of the smoke treating units comprise a smoke driver, like a fan, in order to move the smoke from the outlet of the roasting apparatus to the smoke treating unit, Some smoke treating units can comprise a condenser to decrease the temperature of the treated smoke before it is dispensed inside the room.

Preferably, the smoke treating units are comprised in the list of afterburners, catalytic afterburners, filters able to retain volatile organic compounds, hydrocarbons and/or particulate matters, electrostatic precipitators, a duct connected to the outside of the room and combinations thereof.

These smoke treating units can be installed in public rooms like cafés, shops or restaurants in particular due to their easy operation or maintenance by non-specialised operators.

The method comprises a step of receiving room data input indicating the country of the room and providing directly or indirectly the ventilation rate of the room.

The country of the room enables to know which health and safety regulations in public area the use of the roasting apparatus shall respect. In this step of receiving room data input, the maximum number of people that can be present in the room may be indicated too; actually some health and safety regulations in public areas and working environments are linked to this piece of information.

Generally, the method comprises a step of getting access to health and safety regulations in terms of contaminant levels emitted in a public room per country or geographical area and precisely to the authorised concentrations of specific contaminants. These regulations can be stored in a memory of the device on which the method is implemented or in a remote server accessible by said device. These regulations can form an accessible database.

The ventilation rate corresponds to the volume of air refreshed from the room per hour, it is usually expressed in $m^3/h$. It is used to estimate the air exchange and therefore the natural elimination of contaminants from the room along time.

The air exchange depends on the type of room and building with specific insulation and on the type of ventilation installed within. Ventilation can be configured to push air out, suck air inside and passive inlets and/or outlets like windows, doors, openings with grids can be present with different dimensions.

Usually, the ventilation rate can be directly provided, because a public room generally comprises a ventilation, such as a fan refreshing air of the room, and the ventilation rate corresponds to the ventilation rate of that ventilation. Optionally, this ventilation rate can be modulated by other factors like the presence of passive inlets and/or outlets.

Alternatively, the ventilation rate can be calculated from received data like the volume of the room and the air change per hour (ACPH) of said room if it is known. The air change per hour is the number of time the complete air volume of the room is exchanged during 1 hour. It reflects the refreshment of all the air inside the room per hour. The air change per hour (ACPH) of a room corresponds to the ventilation rate divided by the volume of the room. Accordingly, the method can comprise the step of receiving room data input indicating at least: the volume of the room and the ventilation rate in the room in order to determine the air change per hour (ACPH) of said room.

In this step of providing the room data input, at least a part of the data can be automatically provided by a localisation device (GPS), a volume measuring device (such as laser device for measuring room dimensions) and/or a wind speed measuring device (for measuring ventilation rate). These devices can be connected wireless to the device implementing the present method to communicate directly the specific measures.

The method comprises a step of receiving roasting use data input indicating the intended use of the roasting apparatus during a pre-determined period in order to determine the quantity of each contaminant produced by the roasting apparatus during said period.

At each roasting operation, contaminants are produced and dispensed through the smoke. These contaminants include in particular critical gaseous compounds like: CO, $CO_2$, diacetyl, formaldehyde, methanol, NO, $NO_2$, pyridine, $SO_2$, 2-furanmethanol, and particulate matters such as $PM_{10}$, $PM_{2.5}$. The list may depend on the type of roasting apparatus used. For example, roasting apparatus using fuel as the heating source may generate $CO_2$ which is not the case of an electrically energised roasting apparatus.

The produced amount of these contaminants at each roasting operation depend on several factors and at least:

the quantity of the coffee beans that are roasted, the nature of the coffee beans that are roasted. For example, roasting of Robusta coffee beans produces contaminants different from roasting of Arabica beans.

the level of roasting applied to the coffee beans. The production of light roasted beans emit less contaminants than dark roasted beans.

the type of roaster used for the roasting. Nature of the source of heating directly impacts the emitted compounds. For example, drum roasters emit more contaminants than an air fluidised bed roaster.

Depending on the commercial habits of the coffee shop owner, the number of roasting operations per day, the times at which the roasting operations happen during the day can impact the concentration of contaminants in the room during the whole day or during a peak operation period.

Preferably, the roasting use data indicating the intended use of the roasting apparatus comprises at least:

the amount of coffee beans roasted per day, and the intervals between roasting operations, and optionally the weight of beans roasted per roasting operation and/or the roasting level of the coffee beans at the end of the roasting operation and/or the type of coffee beans roasted in the roasting apparatus.

The input about the intervals between roasting operations can be indicated precisely or selectable in a limited list of inputs like: consecutive, spread over 8 hours, every 15 minutes, every half an hour.

In some embodiments, some use input data can be automatically set to the worst scenario like: consecutive roasting operations, dark roasting level, maximum allowable amount of coffee beans in the roasting chamber per roasting operation.

The period of time during which the intended use happens usually correspond to the opening hours of a coffee shop and/or to specification of regulations for example about 8 hours. It can eventually be adapted depending of the type of public room (restaurant, coffee shop, bar, . . . ) or can be adapted to particular specification of regulations for example respect of contaminants levels on a 15 minutes period.

The roasting use data enables to know which quantities of contaminants are produced during roasting operations Generally, the method comprises a step of getting access to the quantity of each contaminant produced by a defined roasting apparatus during the operation of roasting a specific quantity of a specific type of coffee beans up to a specific roasting level.

These quantities can be stored in a memory of the device on which the method is implemented or in a remote server accessible by said device. These quantities can form an accessible database.

Usually these quantities are defined by experimentation by implementing different roasting scenarios in the defined roasting apparatus and measuring the quantity of each contaminant in the produced smoke.

Based on the roasting use data and on the said accessible quantities, the quantities produced at each roasting operation according to the indicated intended use can be calculated.

Based on the intended use other the pre-determined period, the quantity of each contaminant produced by the roasting apparatus during the period is determined.

Preferably, the quantity of at least one contaminant comprised in the list of: CO, $CO_2$, diacetyl, formaldehyde, $PM_{10}$, $PM_{2.5}$, methanol, NO, $NO_2$, pyridine, $SO_2$, 2-furanmethanol and produced by the roasting apparatus during the intended use of the roasting is determined.

Preferably, the respective quantities of several of said contaminants is determined depending on the health regulations to be respected.

Generally, the method comprises a step of getting access, for each smoke treating unit, to the performance of reduction of the level of each contaminant by said smoke treating unit.

These performances can be stored in a memory of the device on which the method is implemented or in a remote server accessible by said device. These performances can form an accessible database.

Usually these performances are defined by previous experimentation which consists in treating different contaminants with the smoke treating unit and in measuring the quantity of each contaminant after treatment. Optionally they can be defined according to the specification of the smoke treating unit provided by the manufacturer.

In a further step, for each system of the roasting apparatus and of one of the smoke treating units, the method usually comprises the step of determining the quantity of each contaminant dispensed by said system during the period from the determined quantity of each contaminant produced by the roasting apparatus during the period.

For each smoke treating unit and for each contaminant, the yield of reduction is applied to the determined quantity of said contaminant produced by the roasting apparatus during the period. As a result, the quantity of said contaminant dispensed by the total system during the time period is determined. This quantity is dispensed in the room and, based on the volume of the room, provides the maximum concentration of said contaminant in the room. Yet due to the usual presence of the ventilation and the removal of a part of air and contaminant from the room, the real concentration is lower than this maximal concentration.

Accordingly, in a final step to determine the concentration of each contaminant present in the room during the time period, the method usually comprises the step of calculating, from the ventilation rate and from above determined quantity of each contaminant dispensed by the system during the period, the concentration of each contaminant present in the room during the period.

In this step, the ventilation rate is taken into account by applying a rate of decrease of the concentration of the contaminants along time.

The step of determining the concentration of each contaminant present in the room during the time period can be implemented with different levels of precision. In a basic mode, it can be considered that all the contaminants produced during one roasting operation are produced and emitted in the room simultaneously at a certain time of the roasting operation (for example at a time comprised between the first crack and the second crack).

In a more precise mode, the kinetics of emissions of the different contaminants during the time of one roasting operation can be taken into account.

The step of determining the concentration of each contaminant present in the room over a period takes into account the accumulation of contaminants further to successive roasting operations. New emitted contaminants are added to the quantity of emitted contaminants of the precedent roasting operation(s) that have not yet been evacuated by the ventilation of the room.

The method comprises, for each system and for each contaminant, the step of comparing the calculated concentration of said contaminant present in the room during the time period with the accessible concentration of said contaminant authorised according to local health and safety regulations.

Usually, to implement this step, the method comprises getting access to health and safety regulations in different countries or geographical areas in terms of contaminant levels emitted in a public room.

Finally the method comprises selecting the smoke treating unit of the system in the list of smoke treating units providing for each contaminant a calculated concentration inferior to the authorised concentration.

If different smoke treating units are selected, the final choice can be based on additional criteria like the cost to buy and install, the cost to use, the volume or congestion of the unit with direct impact on the position of the roasting apparatus inside the shop, the noise and/or the heat produced during use, the need to clean, the foot print, the number of roasting apparatuses installed in the shop, the shop setup (fully closed in winter, open to the street in summer), . . . .

In one preferred embodiment, the method can comprise the step of displaying a diagram presenting, for each contaminant and for each smoke treating unit selected by the user:

the calculated concentration of said contaminant present in the room during the intended use of the roasting apparatus, the limit of concentration of said contaminant authorised according to local health and safety regulations.

The method can be implemented on a computer, a mobile device like a smartphone or a table app or even directly in the control system of a roasting apparatus.

In a second aspect, there is provided a computer program comprising instructions which, when executed by a computer, processor or control unit, cause the computer, processor or control unit to perform the above method.

In one embodiment, the computer program can be executed by the processing unit of a mobile device.

In a third aspect, there is provided a computer readable storage medium comprising instructions which, when executed by a computer, processor or control unit cause the computer, processor or control unit to carry out the above method.

In a fourth aspect, there is provided a method to check the safe operation of a specific system of a pre-defined coffee beans roasting apparatus and a pre-defined associated smoke treating unit configured to treat the smoke emitted by said roasting apparatus in different rooms according to different intended uses, said method comprising the steps of:

receiving room data input indicating the country of the room and the ventilation of said room, receiving roasting use data input indicating the intended use of the pre-defined roasting apparatus during a pre-determined period in order to determine the quantity of each contaminant produced by the roasting apparatus during said period for said use, for the specific pre-defined system of the roasting apparatus and the pre-defined smoke treating unit, calculating, from the determined quantity of each contaminant produced by the roasting apparatus during the period for said use, from the performance in reducing the level of said contaminant by the smoke treating unit, and from the ventilation rate, the concentration of each contaminant present in the room during the period, for each contaminant, comparing the calculated concentration of said contaminant present in the room during the period with the concentration of said contaminant authorised according to local health and safety regulations, confirming the safe operation of the specific system in the room if for each contaminant the calculated concentration is inferior to the authorised concentration.

This method enables the verification of the safe operation of a specific system of a pre-defined roasting apparatus with a pre-defined smoke treating unit, when this specific system is intended to be used in a new room by a new operator. This method is particularly applied when the specific system is sold to a customer operating in a particular shop, café or restaurant and having personal habits for the roasting operations. In order to validate the safety of operation of the specific system by the customer, this method is implemented taking into account the parameters of the room (ventilation rate, local regulations to be respected) and the roasting habits of the operator.

If the safe operation is confirmed, the system can be operated in the room with the intended use. Otherwise, a proposal to use another smoke treating unit for the system can be proposed.

In particular, if the safe operation of the specific system is not confirmed, then the method according to the first aspect to select a smoke treating unit for the pre-defined coffee beans roasting apparatus can be implemented, wherein said smoke treating unit is selected from a group of smoke treating units different from the pre-defined associated smoke treating unit of the specific system.

In a fourth aspect, there is provided a computer program comprising instructions which, when executed by a computer, processor or control unit cause the computer, processor or control unit to perform the above method to check the safe operation of a specific system.

In one embodiment, the computer program can be executed by the processing unit of a mobile device.

In a firth aspect, there is provided computer readable storage medium comprising instructions which, when executed by a computer, processor or control unit cause the computer, processor or control unit to carry out the above method to check the safe operation of a specific system.

In the present application, by smoke, it is meant the gases and particulate matters produced during the roasting of coffee beans.

In the present application, by contaminant, it is meant a gaseous compound or particulate matters considered as potentially harmful for health according to health regulations.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures:

FIG. 5 is a block diagram illustrating the different steps of a method of checking the safe use of a system according to the invention.

DETAILED DESCRIPTION OF THE EXEMPLARY EMBODIMENTS

Figure 1:
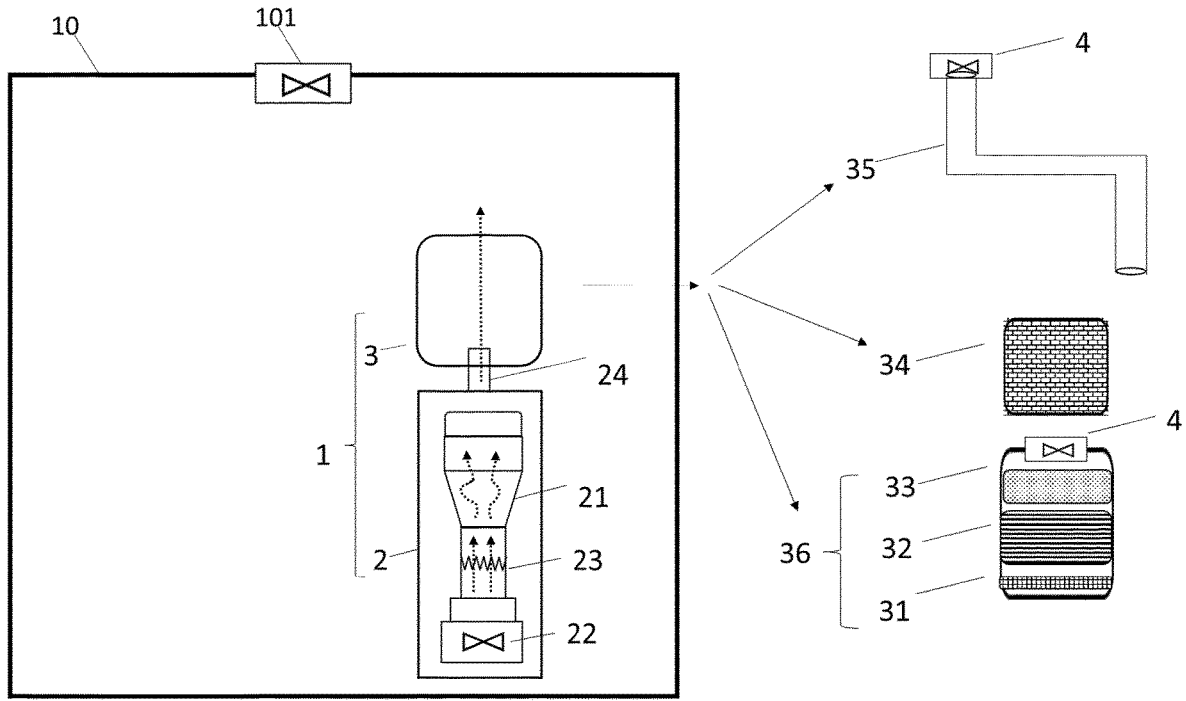
FIG. 1 is schematic drawing illustrating a system of a roasting apparatus and a smoke treating unit operated in a room and the availability of different types of smoke treating units for the system.

FIG. 1 illustrates a room 10 in which a roasting operation is implemented with a system 3 comprising a roasting apparatus 2 and a smoke treating unit 3. The apparatus 2 and the unit 3 cooperate one with the other so that the smoke 24 produced by the roaster is introduced in and treated by the smoke treating unit.

The room 10 comprises a ventilation 101 configured to refresh air from the room.

The smoke treating unit 3 can be of different natures. As illustrated in FIG. 1, this unit 3 can be:

an afterburner 34 in which smoke 24 is introduced and compounds are decomposed by heating at high temperature, a duct 35 configured to conduct smoke 24 directly to the ventilation 101 or another outlet of the room, a smoke treating unit 36 composed of three different sub-smoke treating units 31, 32, 33, for example a PM filter, an electrostatic precipitator and an active carbon filter according to the flow of the smoke. This unit 36 comprises also a smoke driver 4, e.g. a sucking fan, to enable the flow of smoke to circulate from the PM filter to active carbon filter.

Not illustrated some treating units can be mesh filters, paper filters, active carbon filter, . . . . These different smoke treating units 34, 35, 36 differ by their capacities to treat contaminants of the smoke 24, in particular by their performances in reducing the level of all potentially hazardous contaminants inside the smoke 24. The smoke treating units differ also by their sizes and costs. Usually, the cost of a smoke treating unit 3 is directly linked to its capacity to treat smoke.

An afterburner 34 is very efficient to convert any contaminants present in the smoke 24 but is expansive and presents the drawback of generating a lot of heat.

The duct 35 is very efficient to draw all contaminants out of the room but impacts the space of the room and requires a powerful smoke driver, regular cleaning of the pipe and the fan, replacement of the fan. Due to the congestion created by the pipe, the roaster cannot be positioned anywhere inside the shop.

The combination of PM filter, electrostatic precipitator and active carbon filter is not costly but does not treat some hazardous contaminants like CO or $CO_2$.

Depending on the type of roasting apparatus used in the room and its intended use, the types and the level of contaminants produced by the roasting apparatus can range very different values:

some combinations of roaster and use emit some contaminants only at low levels, some combinations of roaster and use may emit some contaminants only but at high levels some combinations of roaster and use may emit numerous contaminants, including the most hazardous, but at a moderate level These different combinations may require the use of different smoke treating units taking into account the capacity of the smoke treating unit to treat the contaminants and its cost of sale and of use. For example, it may be useless to treat a smoke comprising only diacetyl and formaldehyde as contaminants with an afterburner.

The method of the present invention enables the selection of the smoke treating unit adapted to the roasting unit and its intended use.

Figure 2:
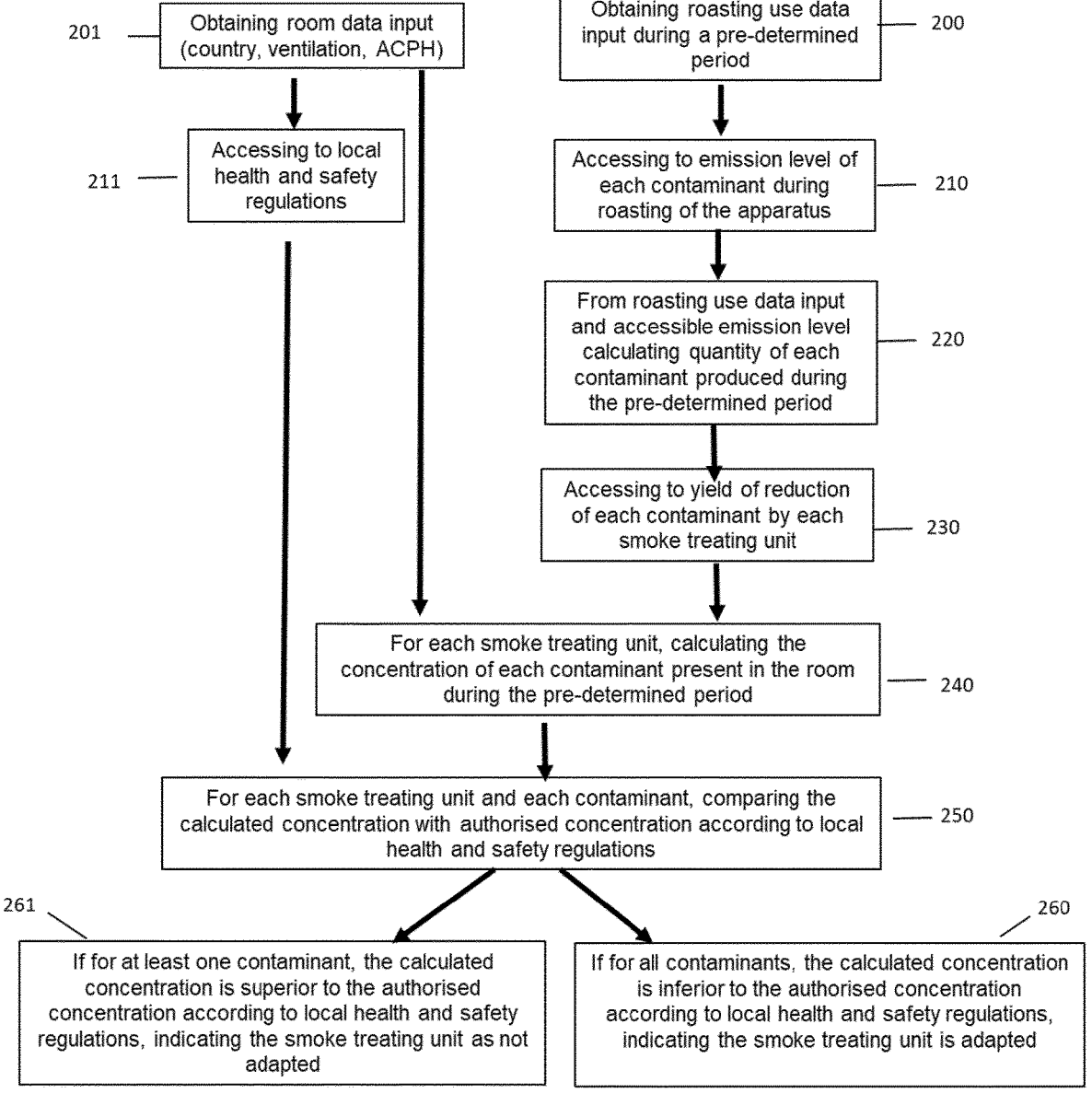
FIG. 2 is a block diagram illustrating the different steps of a method of selecting a smoke treating unit according to the invention, FIGS. 3A and 3B exemplify input and output that can be displayed during the implementation of the method, FIGS. 4A to 4C provides curves of the concentration of one contaminant in the room during the intended use of the roasting apparatus with different types of smoke treating unit.

FIG. 2 is a block diagram illustrating the different steps of the method implemented to select the smoke treating unit of a system based on the specificities of the room and the intended use of the roasting apparatus.

In step 200, data are obtained relative to the intended use of the roasting apparatus during a pre-determined period. The method is applied for a specific pre-defined roasting apparatus, yet in an alternative the method can be applied for different pre-defined roasting apparatuses too; in that case, the method comprises a step of obtaining data about the type or model of roasting apparatus to be used.

The intended use relates to the habits of the operator in terms of roasting during the opening hours, that is usually during 8 consecutive hours. For this reason and because many health regulations are defined on an 8 hours period, by default, the pre-determined period for intended use can be set to 8 hours. The intended use usually comprises the following pieces of information:

the quantity of coffee bans roasted per day, and the times of the roasting operations or the intervals between roasting operations during the pre-determined period. This piece of information can be provided by suggesting a list of scenarios like: consecutive, spread over 8 hours, every 15 minutes, every half an hour, . . .

optionally the amount of beans roasted per roasting operation, by default this amount is set to be the maximum amount that can be contained in the roasting chamber of the roasting apparatus, optionally the roasting level of the coffee beans at the end of the roasting operation, by default this level is set to be dark because the roasting to dark level creates more contaminants than other types.

optionally the type of coffee beans roasted in the roasting apparatus.

In step 201, room data is obtained providing at least the country where the room is situated and the ventilation rate or the ACPH and the volume of the room. Steps 200 and 201 can happen simultaneously or subsequently. Preferably, they are requested from the operator simultaneously.

In step 210, the method provides the access to the emission level of each contaminant produced during one operation of the defined roasting of the apparatus. Such information is usually established by experimentation on the roasting apparatus with different conditions of use, in particular different levels of roasting, different types of beans and different amounts of beans in the roasting chamber. By default, the emission level of each contaminant is established with the maximum amount of beans in the chamber and for roasting to dark level. These levels of emissions of each contaminant according to the roasting conditions can be part of a database accessible during the implementation of the method. This step is based on experimental data established during the roasting operation of the roasting apparatus in different conditions, these conditions covering all the usual roasting uses, in particular the following conditions:

use of different types of coffee beans (Arabica, Robusta, blend), use of different quantities of beans per roasting operation (depends on the capacity of the roasting chamber), roasting beans at different levels (light, medium, dark), the frequency of the roasting operation like: "consecutive", "every 15 minutes", "every half hour", "spread over 8 hour shift".—

In step 220, based on the obtained roasting use data and the accessible emission level of each contaminant, the quantity of each contaminant produced by the roasting apparatus according to the intended use during the pre-determined period is calculated.

In one simplest mode, the accessible emission level of each contaminant can relate to the roasting of one average weight of beans and, based on the intended use, in particular the quantity of beans per roast, the calculated quantity of each contaminant produced by the roasting apparatus can be calculated by extrapolation from the accessible emission level of each contaminant for that average weight by applying the percentage of increase or decrease of the weight to the accessible amount of contaminants.

In step 230, the method provides the access to the yield of reduction of each contaminant by each smoke treating unit in a list of pre-defined smoke treating units that can be connected to the roasting apparatus. Such information is usually established by experimentation on the smoke treating units with different contaminants preferably by accredited laboratories. Measures can be done directly by means of VOCs or PM sensors or indirectly by accumulation of contaminants on specific substrates during the full roasting operation.

These yields of reduction of the contaminants by the smoke treating units can be part of a database accessible during the implementation of the method.

In step 240, for each smoke treating unit of a list of predefined smoke treating units, and based on:

the quantity of each contaminant produced by the roasting apparatus during the pre-determined period, and on the yield of reduction of each of said contaminant by each smoke treating unit, and on the ventilation rate or the ACPH of the room provided at step 201, the concentration of each contaminant present in the room during the pre-determined period is calculated for each smoke treating unit.

This calculation consists in calculating the whole quantity of each contaminant, either gaseous or particulate matter, emitted at each roasting operation inside the room and calculating the part of the contaminant trapped by the smoke treating unit and the part of contaminant removed from the room based on the air change per hour and reproducing the calculation for all new roasting operations along the pre-determined period.

Figure 4A:
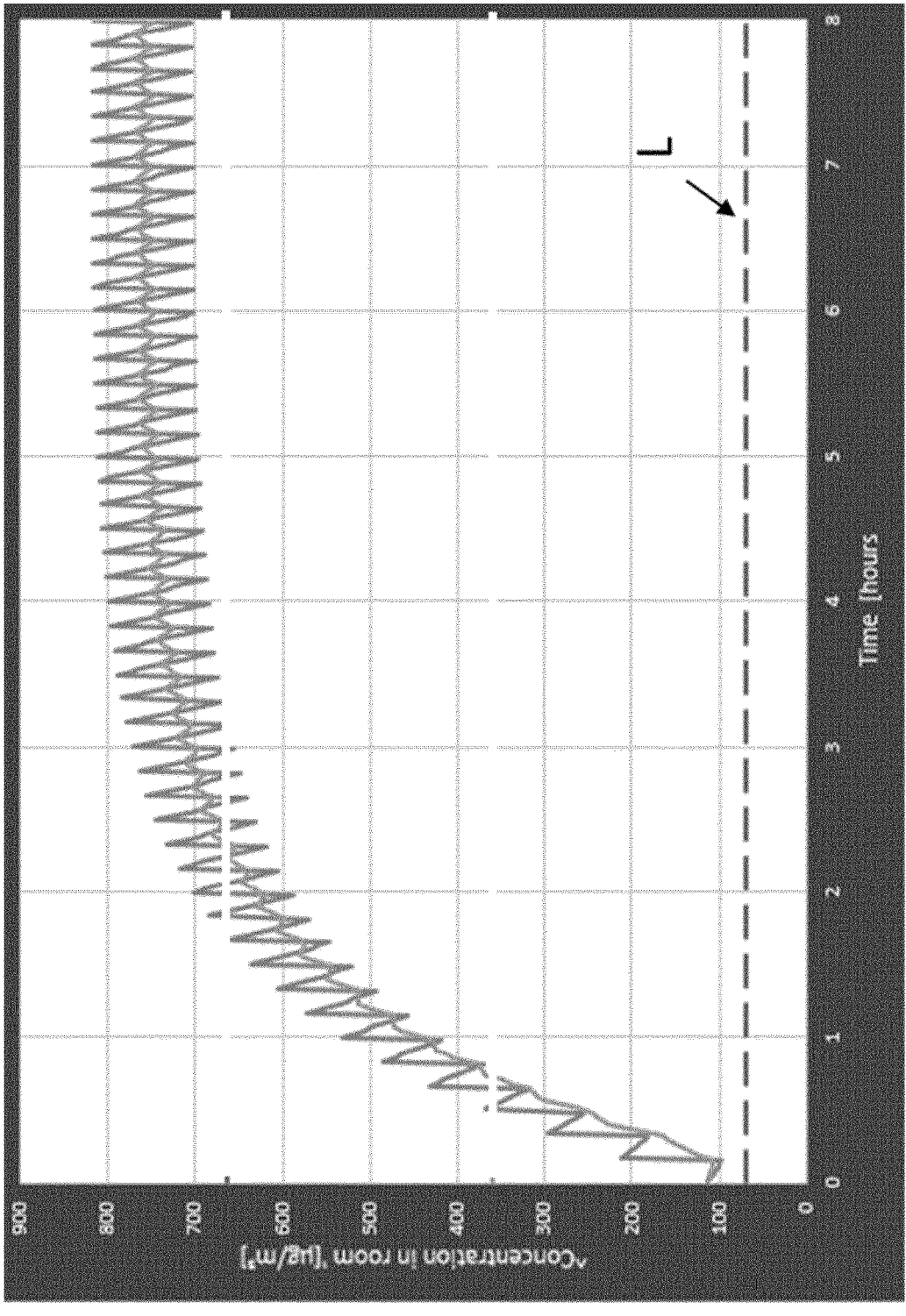
Figure 4B:
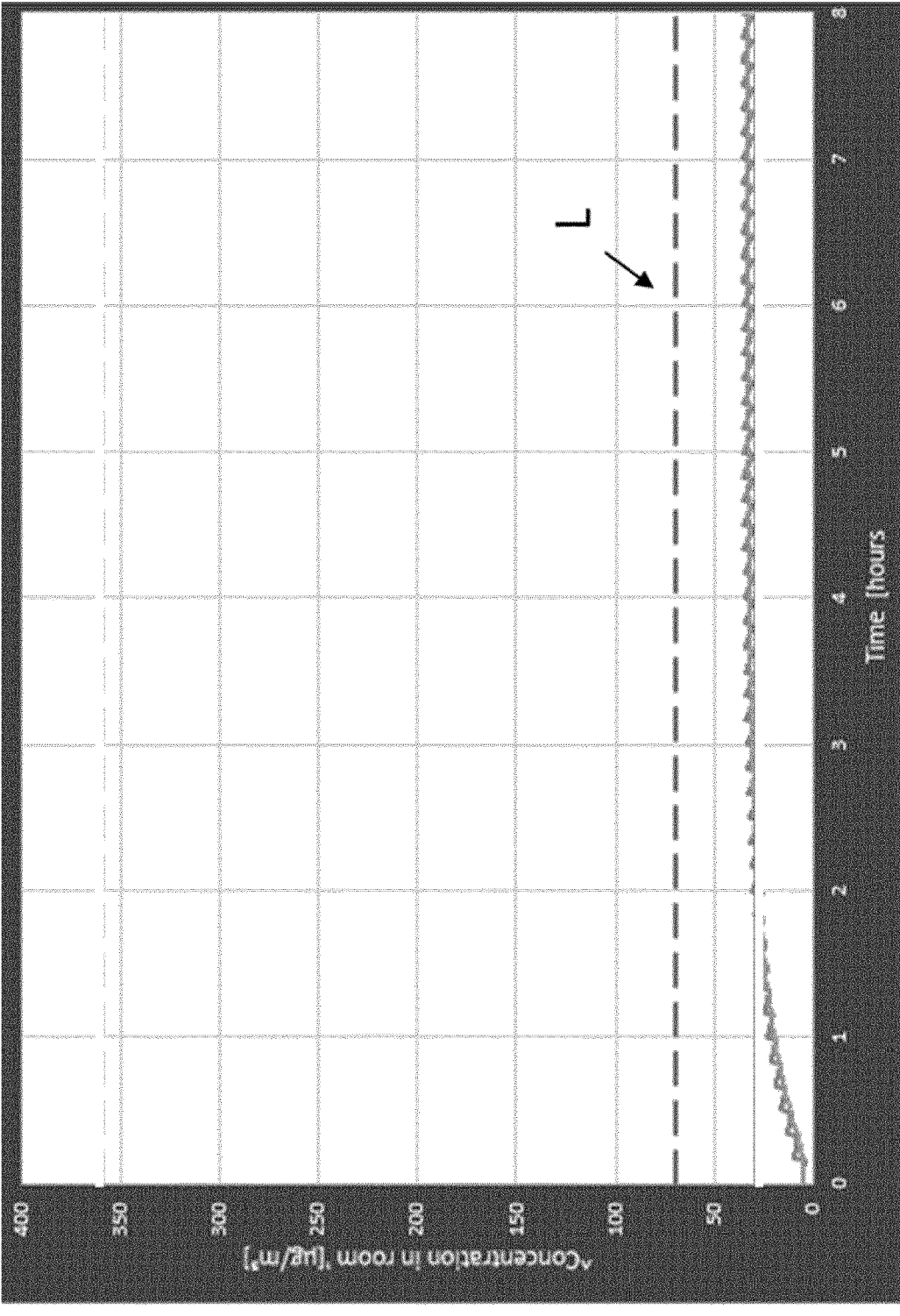
Figure 4C:
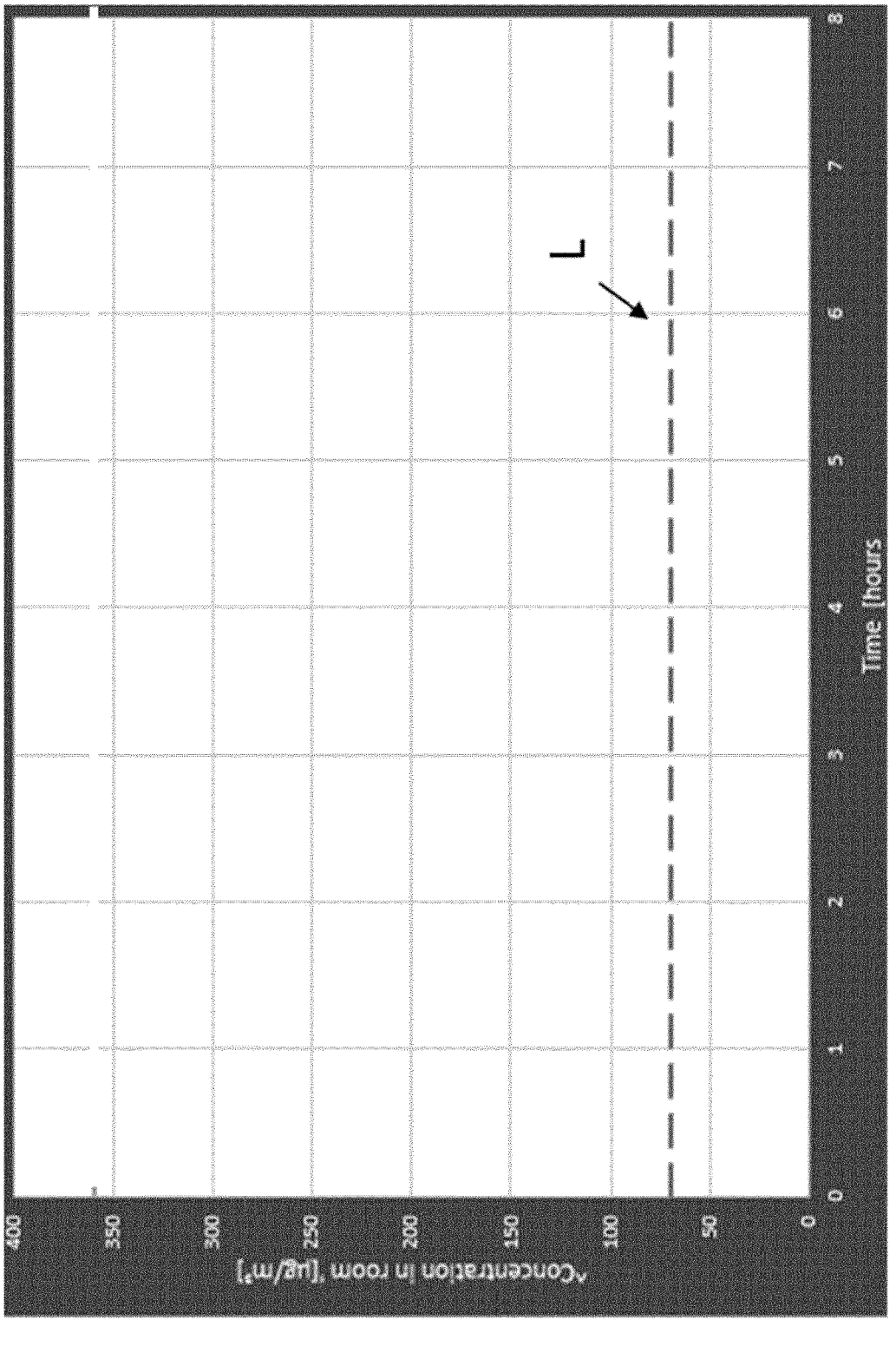

For example, this calculation is illustrated by the curves of FIGS. 4A to 4C providing the concentration ($\mu g/m^3$) of diacetyl in the room during a period of 8 hours when the roasting apparatus is operated consecutively to roast 5 kg of Robusta beans per batch of 100 g of beans to a dark level within a room with a ventilation of 1.00 air change per hour. FIG. 4A illustrates the concentration of diacetyl in the absence of smoke treating unit, FIG. 4B illustrates the concentration of diacetyl in the room with a system comprising a smoke treating unit of the type 36 and FIG. 4C illustrates the concentration of diacetyl in the room with a system comprising a smoke treating unit of the type 35.

In step 250, for each smoke treating unit, the calculated concentration of each contaminant is compared to the concentration authorised according to local health and safety regulations. These regulations are obtained based on the input of the country obtained at step 201. In a step 211, access to these regulations can be implemented.

If during at least one part of the pre-determined period, the calculated concentration of at least one contaminant is superior to the respective authorised concentration, the method indicates at step 261 that the respective smoke treating unit is not adapted.

If during the whole pre-determined period, the calculated concentration of all the contaminants is inferior to the respective authorised concentration, the method indicates at step 260 that the respective smoke treating unit is adapted.

In FIGS. 4A to 4C the authorised concentration of diacetyl in Netherlands is illustrated by the limit L that is 75 $\mu g/m^3$. It appears that:

on FIG. 4A, without any smoke treating unit, from the first roasting operation to the last one, the concentration of diacetyl is always above the limit L. The ventilation of the room is not sufficient to evacuate the smoke generated by the roasting apparatus. The use of a smoke treating unit is necessary.

on FIG. 4B, with the smoke treating unit of the type 36, the concentration of diacetyl is always maintained at a concentration of about 25 $\mu g/m^3$ inferior to the limit L. This smoke treating unit is adapted to this room in this country, this roasting apparatus and this intended use.

on FIG. 4C, with the smoke treating unit of the type 3, the concentration of diacetyl produced by the roasting apparatus and dispensed in the room is always zero since all the smoke of the roasting apparatus is conducted to the outside of the room. This smoke treating unit is adapted.

FIGS. 3A and 3B illustrates an example of display that can be presented on a mobile device or a computer to implement the method according to the invention. In FIG. 3A, the display provides the fields to be filled by the user. The method is applied by enabling the user to provide data input about the room 10, in particular:

the country of the room, that will enable the control of the respect of the health and safety regulations for that room.

the floor space and the ceiling weight to calculate the volume of the room, the ventilation rate of the room, the maximum number of people in the room, as this piece of information may be necessary in view of the health and safety regulations.

The user is also asked to provide information about the intended use of the roasting apparatus 2, in particular:

the amount of coffee roasted per day (here 10 kg), the roasting scenario that is the frequency of the roasting operation: that can be indicated from a pre-set list of selectable scenarios like: "consecutive", "every 15 minutes", "every half hour", "spread over 8 hour shift", the desired roasting level of the coffee beans that is high, medium, light, the type of beans that can be indicated from a pre-set list of selectable beans such as Robusta, Arabica, blend, the amount of beans per roasting operation (here 250 g).

Based on the input about the room, the air change per hour can be calculated, here 1.

Based on information about intended use of the roasting apparatus 2, the method getting access to a contaminant level database providing the quantity of each contaminant produced by the roasting apparatus during the operation of roasting a specific quantity of a specific type of coffee beans up to a specific roasting level.

FIG. 3B illustrates the display filled by the user and the corresponding results in terms of adapted smoke treating units.

With the specific room (in Netherlands, a floorspace of 100 $m^2$, 2 m height, ventilation rate at 200 $m^3/h$ and a maximum number of 20 people in the room) and with 10 kg of Robusta beans per batch of 250 g roasted in a consecutive manner at dark level, the results are that only the smoke treating unit 35 and 34 are adapted.

FIG. 5 is a block diagram illustrating the different steps of a method of checking the safe operation of a specific system of pre-defined roasting apparatus and a pre-defined smoke treating unit in different rooms and according to different intended uses.

Steps similar to the block diagram of FIG. 2 are present except that:

steps 230, 240 and 250 are implemented for the pre-defined smoke treating unit only, steps 620 and 621 confirm or not the safe operation of the specific system.

Figure 6:
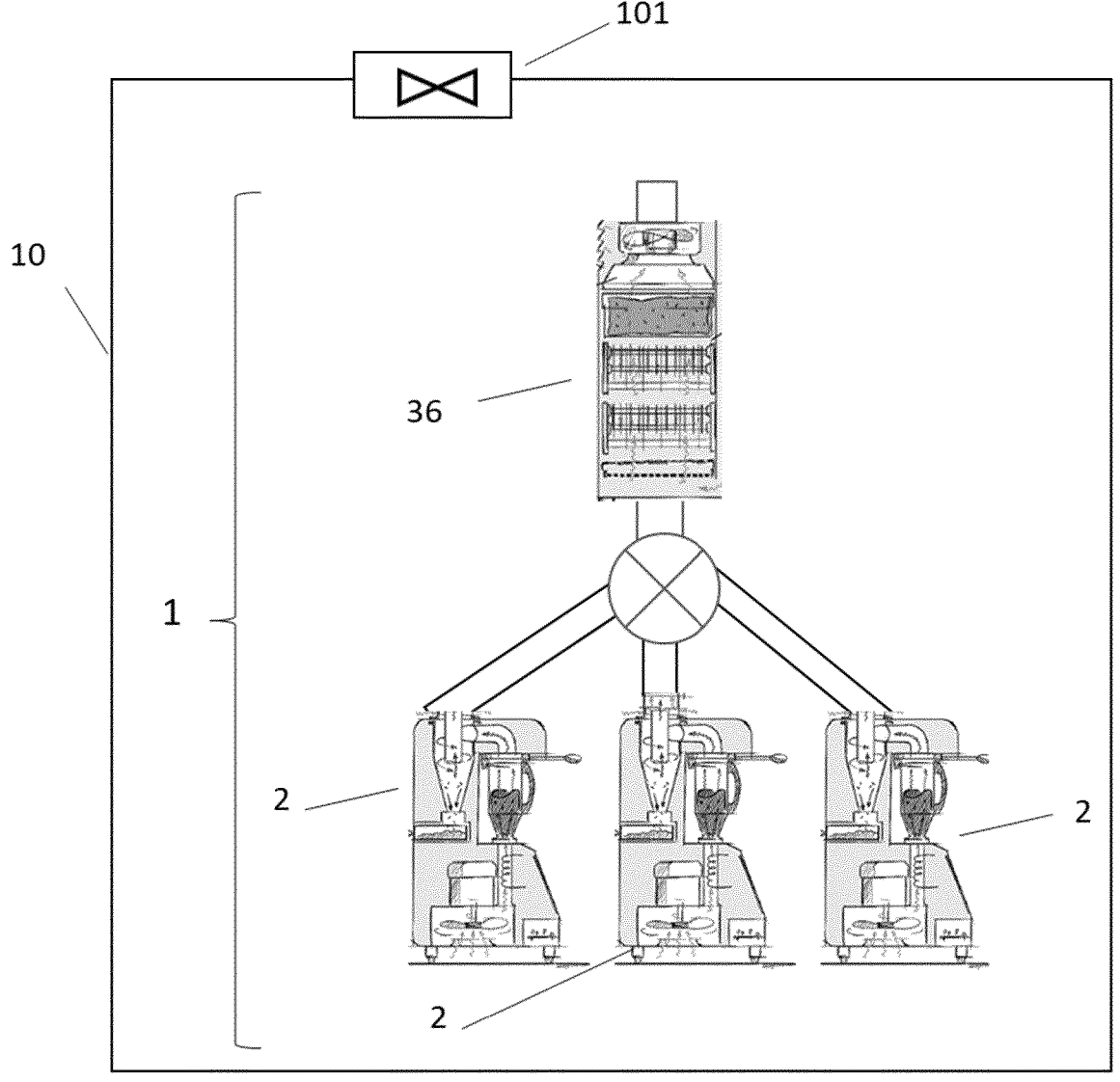
FIG. 6 is schematic drawing illustrating a system of several roasting apparatuses and one smoke treating unit operated in a room.

FIG. 6 illustrates the situation where several roasting apparatuses 2 are operated in the same room 10. It is desired to connect the outlets of these three apparatuses to a common smoke treating unit 36. Based on the above described method, the safe use of this system 1 in the room 10 equipped with the ventilation 101 can be checked. If the safe use is not confirmed, an alternative smoke treating unit can be suggested, like the units 34 or 35 described in FIG. 1.

The method enables the selection of the right smoke treating unit adapted to the room and the roasting habits of the operator.

An advantage of the method is that it enables the selection of a smoke treating unit that does not require purchase and use costs or a complex implementation inside the room that are disproportionate to the room and the desired use.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS system 1
roasting apparatus 2
vessel 21
heater 22
air driver 23
roaster smoke 24
smoke treating unit 3, 31, 32, 33, 34, 35, 36
room 10
ventilation device 101
The invention claimed is:

1. A method to select a smoke treating unit of a system, the system comprising (i) at least one pre-defined coffee beans roasting apparatus and (ii) the smoke treating unit, wherein the smoke treating unit is selected from the group consisting of afterburners, catalytic afterburners, filters able to retain volatile organic compounds, hydrocarbons and/or particulate matters, electrostatic precipitators, a duct connected to the outside of the room, and combinations thereof, the method comprising the steps of:

receiving room data input indicating a country of a room in which the system is used and providing directly or indirectly a ventilation rate of the room, receiving roasting use data input indicating an intended use of the at least one pre-defined coffee beans roasting apparatus during a pre-determined period, wherein the roasting use data input comprises a quantity of coffee beans roasted per the pre-determined period and times of a roasting operation during the pre-determined period, determining a quantity of each contaminant produced by the at least one pre-defined coffee beans roasting apparatus during the pre-determined period, wherein determining the quantity comprises the steps of:

getting access to a quantity of each contaminant produced by the at least one pre-defined coffee beans roasting apparatus during one roasting operation of a specific quantity of a specific type of coffee beans up to a specific roasting level, based on the roasting use data input and on the quantities during the one roasting operation, determining the quantity of each contaminant produced by the at least one pre-defined coffee beans roasting apparatus during the pre-determined period, a concentration of each contaminant present in the room during the pre-determined period for each smoke treating unit, by:

getting access, for each smoke treating unit, to an amount of reduction of each contaminant by the smoke treating unit, determining a quantity of each contaminant dispensed by the system during the pre-determined period for each smoke treating unit based on (i) the determined quantity of each contaminant produced by the at least one pre-defined coffee beans roasting apparatus during the pre-determined period by deducing each contaminant by each trapped by the respective smoke treating unit, calculating, from the ventilation rate and from the quantity of each contaminant dispensed by the system during the pre-determined period, the concentration of each contaminant present in the room during the pre-determined period, for each smoke treating unit and for each contaminant, comparing the concentration of the contaminant present in the room during the pre-determined period with an authorized concentration of the contaminant according to local health and safety regulations, selecting at least one smoke treating unit where the concentration of each contaminant present in the room during the pre-determined period is inferior to the authorized concentration.

2. The method according to claim 1, wherein the room data input indicates at least: a volume of the room and the ventilation rate in the room to determine an air change per hour (ACPH) of the room.

3. The method according to claim 1, wherein the roasting use data input further comprises intervals between roasting operations.

4. The method according to claim 1, wherein the at least one contaminant is selected from the group consisting of: $CO$, $CO_2$, diacetyl, formaldehyde, $PM_{10}$, $PM_{2.5}$, methanol, $NO$, $NO_2$, pyridine, $SO_2$, ozone and 2-furanmethanol.

5. The method according to claim 1, wherein the method comprises the step of getting access to health and safety regulations in different countries or geographical areas in terms of contaminant levels emitted in a public room.

6. The method according to claim 1, wherein the method comprises the step of displaying a diagram presenting, for each contaminant and for each smoke treating unit selected by a user:

the concentration of the contaminant present in the room during the pre-determined period, and the authorized concentration according to the local health and safety regulations.

7. A non-transitory computer readable medium comprising a computer program, wherein the computer program comprises instructions which, when executed by a computer, a processor, or a control unit, cause the computer, the processor, or the control unit to perform a method to select a smoke treating unit of a system, wherein the system comprises (i) at least one pre-defined coffee beans roasting apparatus and (ii) the smoke treating unit, wherein the smoke treating unit is selected from the group consisting of afterburners, catalytic afterburners, filters able to retain volatile organic compounds, hydrocarbons and/or particulate matters, electrostatic precipitators, a duct connected to the outside of the room, and combinations thereof, the method comprising the steps of:

receiving room data input indicating a country of of a room in which the system is used and providing directly or indirectly a ventilation rate of the room, receiving roasting use data input indicating an intended use of the at least one pre-defined coffee beans roasting apparatus during a pre-determined period, wherein the roasting use data input comprises a quantity of coffee beans roasted per the pre-determined period and times of a roasting operation during the pre-determined period, determining a quantity of each contaminant produced by the at least one pre-defined coffee beans roasting apparatus during the pre-determined period, wherein determining the quantity comprises the steps of:

getting access to a quantity of each contaminant produced by the at least one pre-defined coffee beans roasting apparatus during one roasting operation of a specific quantity of a specific type of coffee beans up to a specific roasting level, based on the roasting use data input and on the quantities during the one roasting operation, determining the quantity of each contaminant produced by the at least one pre-defined coffee beans roasting apparatus during the pre-determined period, a concentration of each contaminant present in the room during the pre-determined period for each smoke treating unit, by:

getting access, for each smoke treating unit, to an amount of reduction of each contaminant by the smoke treating unit, determining a quantity of each contaminant dispensed by the system during the pre-determined period for each smoke treating unit by subtracting (i) the determined quantity of each contaminant produced by the at least one pre-defined coffee beans roasting apparatus during the pre-determined period by (ii) the amount of reduction of each contaminant by each smoke treating unit, calculating, from the ventilation rate and from the quantity of each contaminant dispensed by the system during the pre-determined period, the concentration of each contaminant present in the room during the pre-determined period, for each smoke treating unit and for each contaminant, comparing the concentration of the contaminant present in the room during the pre-determined period with an authorized concentration of the contaminant according to local health and safety regulations, selecting at least one smoke treating unit where the concentration of each contaminant present in the room during the pre-determined period is inferior to the authorized concentration.

8. A method to check safe operation of a specific system of a pre-defined coffee beans roasting apparatus and a pre-defined smoke treating unit, the method comprising the steps of:

providing the pre-defined coffee beans roasting apparatus and the pre-defined smoke treating unit, the pre-defined smoke treating unit configured to treat smoke emitted by the pre-defined coffee beans roasting apparatus in different rooms and according to different intended uses, receiving room data input indicating a country of the room and a ventilation rate of the room, receiving roasting use data input indicating an intended use of the pre-defined coffee beans roasting apparatus during a pre-determined period, wherein the roasting use data input comprises a quantity of coffee beans roasted per the pre-determined period and times of a roasting operation during the pre-determined period, determining a quantity of each contaminant produced by the pre-defined coffee beans roasting apparatus during the pre-determined period, wherein determining the quantity comprises the steps of:

getting access to a quantity of each contaminant produced by the at least one pre-defined coffee beans roasting apparatus during one roasting operation of a specific quantity of a specific type of coffee beans up to a specific roasting level, based on the roasting use data input and on the quantities during the one roasting operation, determining the quantity of each contaminant produced by the at least one pre-defined coffee beans roasting apparatus during the pre-determined period, calculating a concentration of each contaminant present in the room during the pre-determined period, by:

getting access to an amount of reduction of each contaminant by the pre-defined smoke treating unit, determining a quantity of each contaminant dispensed by the system during the pre-determined period by subtracting (i) the determined quantity of each contaminant produced by the at least one pre-defined coffee beans roasting apparatus during the pre-determined period (ii) the amount of reduction of each contaminant by the pre-defined smoke treating unit, calculating, from the ventilation rate and from the determined quantity of each contaminant dispensed by the system during the pre-determined period, the concentration of each contaminant present in the room during the pre-determined period, for each contaminant, comparing the concentration of the contaminant present in the room during the pre-determined period with an authorized concentration of the contaminant according to local health and safety regulations, and confirming the safe operation of the specific system in the room if for each contaminant the concentration of the contaminant present in the room during the pre-determined period is inferior to the authorized concentration.

9. The method according to claim 1 wherein, if the safe operation of the specific system is not confirmed, then the method further comprises selecting a smoke treating unit for the pre-defined coffee beans roasting apparatus, wherein the smoke treating unit is selected from a group of smoke treating units different from the pre-defined smoke treating unit of the specific system.

\* \* \* \* \*